United States Patent [19]
Takami

[11] Patent Number: 5,115,659
[45] Date of Patent: May 26, 1992

[54] PROCESS FOR PRODUCING COMPONENT FOR TIRE AND APPARATUS THEREFOR

[75] Inventor: Masao Takami, Kobe, Japan

[73] Assignee: Sumitomo Rubber Industries, Hyogo, Japan

[21] Appl. No.: 623,935

[22] PCT Filed: Jun. 18, 1990

[86] PCT No.: PCT/JP90/00795
§ 371 Date: Feb. 26, 1991
§ 102(e) Date: Feb. 26, 1991

[87] PCT Pub. No.: WO91/00173
PCT Pub. Date: Jan. 10, 1991

[30] Foreign Application Priority Data
Jun. 26, 1989 [JP] Japan .................. 1-164136

[51] Int. Cl.⁵ .......................... B21F 45/00
[52] U.S. Cl. ...................... 72/187; 156/124
[58] Field of Search ............ 72/187, 196, 46; 140/105, 107; 156/124, 422; 152/562

[56] References Cited
U.S. PATENT DOCUMENTS
2,179,374 11/1939 Kraft .................. 152/562
2,538,644 1/1951 Guess .................. 72/196

FOREIGN PATENT DOCUMENTS
38668 12/1975 Japan .................. 156/124
69030 4/1982 Japan .
75227 3/1989 Japan .
2156108 10/1985 United Kingdom ....... 72/187

*Primary Examiner*—Lowell A. Larson
*Attorney, Agent, or Firm*—Birch, Stewart, Kolasch & Birch

[57] ABSTRACT

A process and an apparatus for producing a component of tires by passing a wire sheet (3) between a pair of gear-shaped rolls (6), (6) in meshing engagement therewith to vertically corrugate the sheet for reforming, the wire sheet (3) comprising wires (4) arranged side by side in a plane and covered with an elastic material (5), and thereafter passing the sheet (3) between a pair of rolls (13), (13) to thereby lay down the reformed vertical corrugations into a planar arrangement.

25 Claims, 3 Drawing Sheets

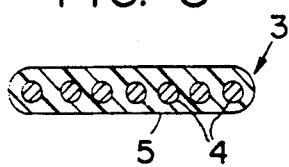
FIG. 3
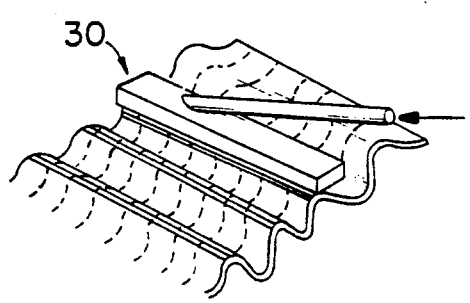
FIG. 4
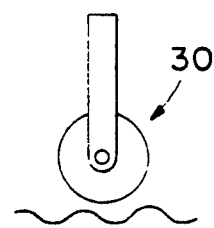
FIG. 5
FIG. 6
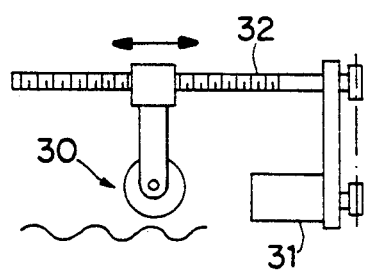
FIG. 7
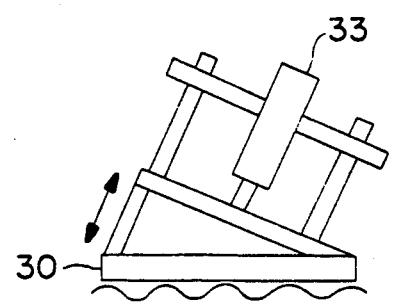
FIG. 8
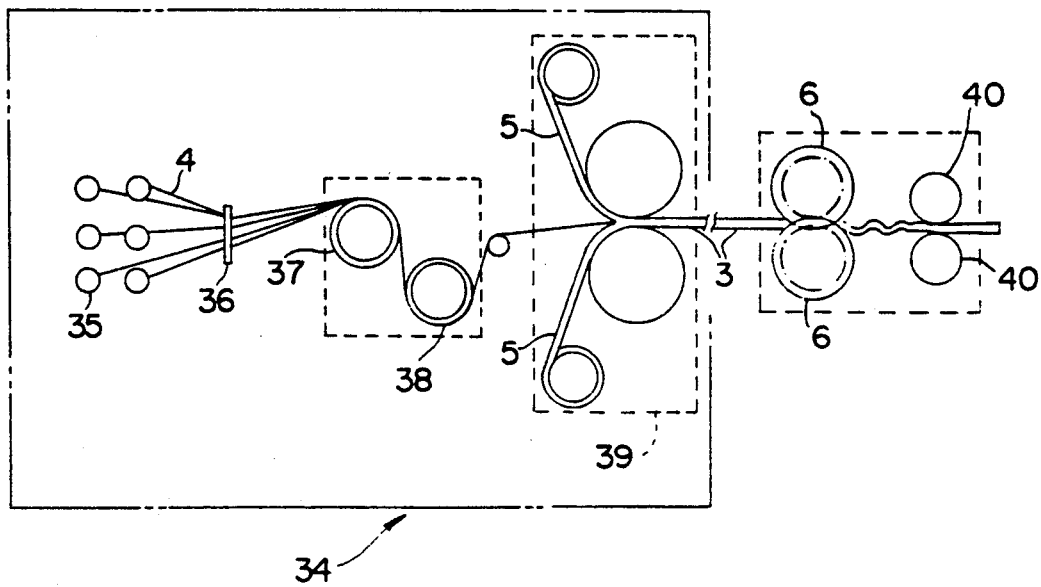

PROCESS FOR PRODUCING COMPONENT FOR TIRE AND APPARATUS THEREFOR

TECHNICAL FIELD

The present invention relates to a process for producing corrugated wire reinforced plies for use as a component of tires to an apparatus for practicing the process.

BACKGROUND ART

Tires are known having embedded therein wires as reinforcing members to give improved cut resistance. These wires are corrugated to impart flexibility to the tire (see, for example, Unexamined Japanese Patent Publication SHO 57-2701704).

Unexamined Japanese Patent Publication SHO 52-8084 or SHO 64-75227 discloses a process and apparatus for producing such corrugated wires.

The conventional process for producing the tire component comprises arranging a multiplicity of parallel wires in a plane, passing the multiplicity of wires between a pair of gears to corrugate the assembly of wires, subsequently laying down the vertically corrugated wires into a planar arrangement by means of rollers, and thereafter covering the assembly with rubber over the upper and lower sides thereof to obtain a corrugated wire ply.

With such a conventional process for producing the tire component which handles many separate wires, the shaping of the wires by the gears is dependent largely on the tension applied to the wires immediately before and after they are fed to the gears, and the stretchability of the wires (which is dependent on the material, twist pitch, wire diameter, etc.).

However, the process disclosed in the publication SHO 64-75227 encounters difficulty in shaping the wires because they are subjected to definite tension only immediately before feeding to the gears.

Further, since the individual wires are freely movable until the wire arrangement is covered with rubber in the final step, the conventional process is liable to the serious trouble of some wires crossing other wise owing to a difference in stretchablity between the wires or to inaccurate positioning of the wires relative to one another.

DISCLOSURE OF THE INVENTION

Accordingly, an object of the present invention is to provide a process and an apparatus for producing a tire component by uniformly shaping wires without permitting crossing of the wires.

To fulfill the above object, the wires are shaped restrained from moving freely according to the present invention.

The process of the present invention is characterized by passing a wire sheet between a pair of gear-shaped rolls in meshing engagement therewith to vertically corrugate the sheet, the wire sheet comprising wires arranged side by side in a plane and covered with an elastic material, and passing the shaped sheet between a pair of rolls to lay down the shaped vertical corrugations into a planar arrangement.

The apparatus of the present invention is characterized in that it comprises a pair of gear-shaped rolls for passing a wire sheet therebetween in meshing engagement therewith to vertically corrugate the sheet, the wire sheet comprising wires arranged side by side in a plane and covered with an elasticc material, and a pair of rolls for passing the shaped wire sheet therebetween to lay down the vertical corrugations into a planar arrangement.

The resultant component which is suitable for tires is produced by the process and apparatus of the present invention from a wire sheet which comprises wires arranged side by side in a plane and covered with an elastic material.

Thus, more specifically, the wire sheet is passed between the pair of gear-shaped rolls which are in meshing engagement therewith and thereby vertically corrugated, and is subsequently passed between another pair of rolls, whereby the vertical corrugations are laid down into a planar arrangement.

Previously, where wire sheet was corrugated, there was a problem as to whether the corrugations could be laid down laterally. This was thought impossible, but this invention overturns this common knowledge.

Thus, by the invention when a multiplicity of hard wires covered with unvulcanized rubber or like elastic material in the form of a wire sheet are vertically corrugated and then laterally laid down, the wires can be held laid down to form a planar arrangement by being restrained by the covering material owing to the plasticity of the elastic covering material.

According to the present invention, the wires are restrained from moving by the elastic material and so can be held in a definite position relative to one another and do not cross one another. The difference in strechability between the wires is absorbed by the elastic marterial, so that even if unevenly tensioned before and after the gears, the wires can be formed by the gears into corrugations of the same form and held in equivalent relation to one another in position.

According to the present invention, the multiplicity of wires as covered with an elastic material in the form of a wire sheet are formed into corrugations and laterally laid down. Accordingly, the wires are held in a definite position relative to one another, while the difference in strechability between the wires is absorbed by the elastic material. This permits the gears to form the wires accurately and thus provide outstanding advantages.

BRIEF DESCRIPTION OF THE DRAWINGS

FIG. 3 is a view in section taken along the line III-—III in FIG. 1;

FIG. 4 is a perspective view of a tool for laying down the leading end of a sheet;

FIG. 5 to FIG. 7 are front views showing other tools for laying down the sheet leading end; and FIG. 8 is a diagram showing an arrangement of rolls in another production apparatus embodying the invention.

PREFERRED EMBODIMENTS OF THE INVENTION

Embodiments of the present invention will be described below with reference to the drawings.

Figure 1:
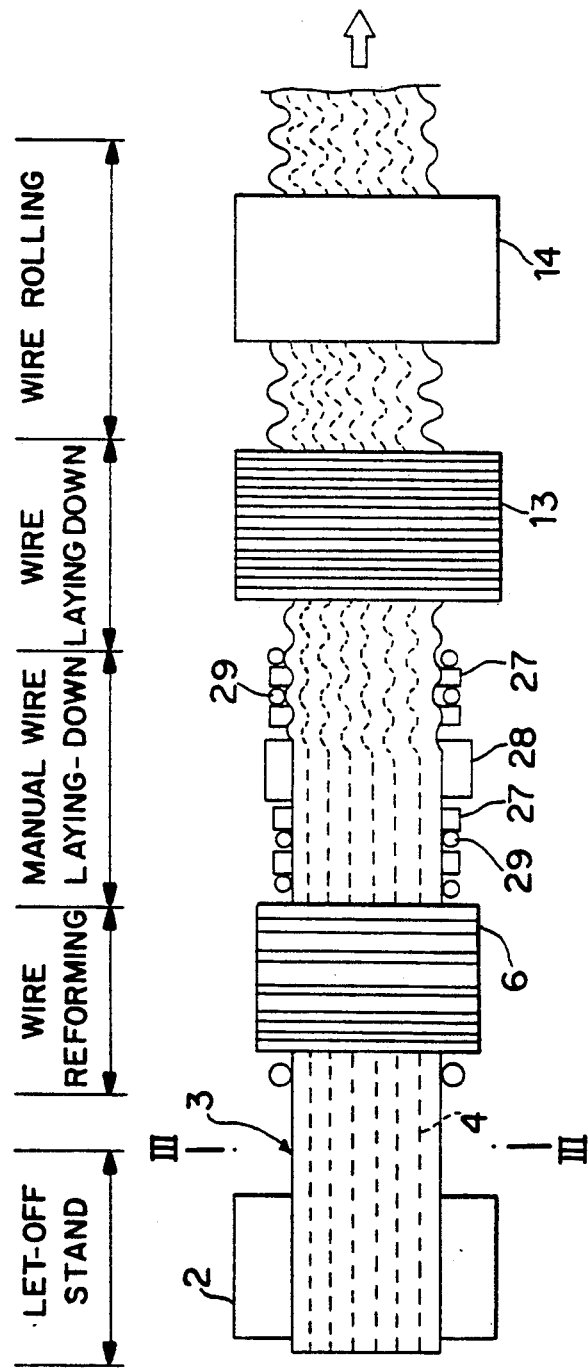
FIG. 1 is a plan view showing a production apparatus embodying the invention.
Figure 2:
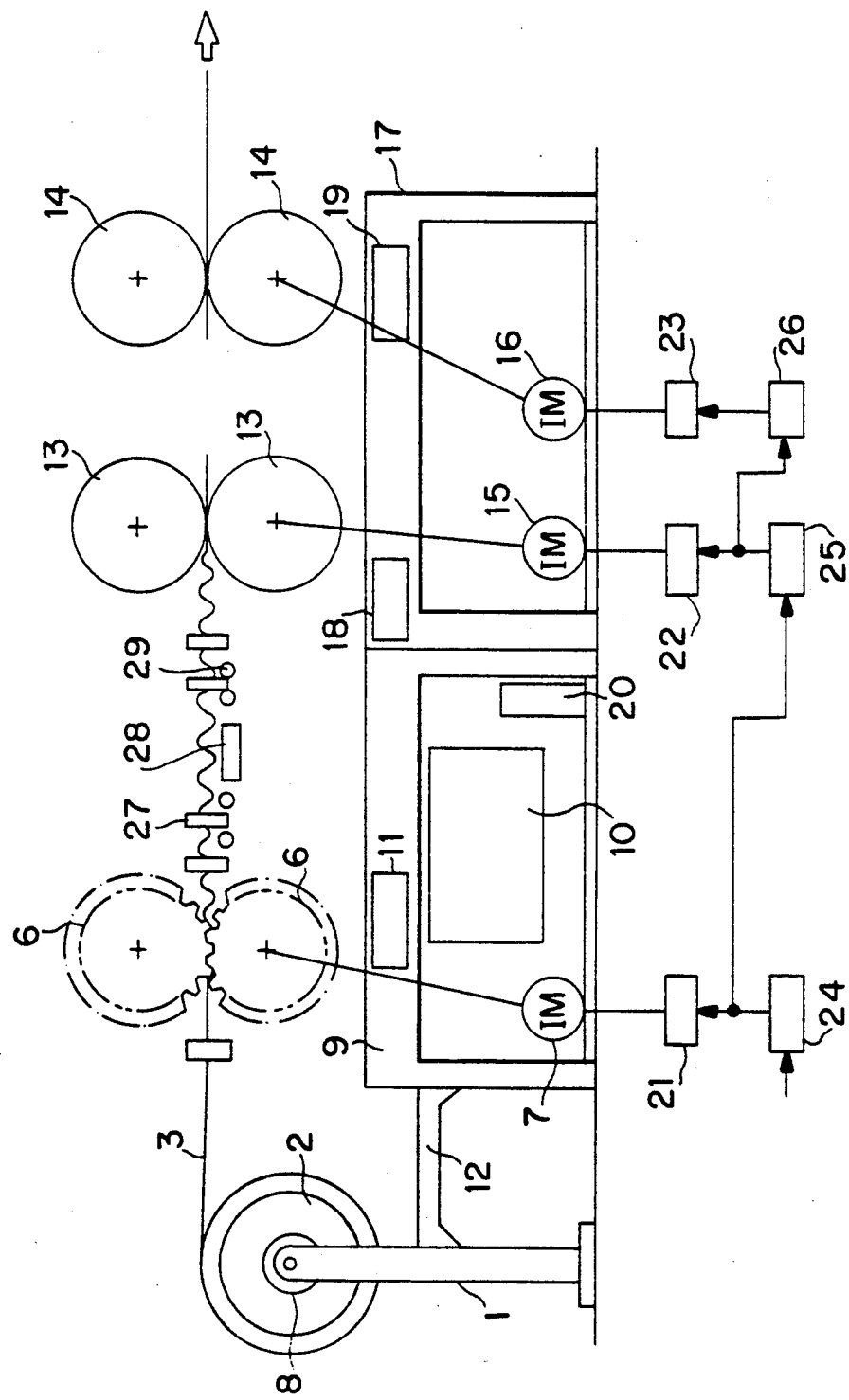
FIG. 2 is a front view of the same.

Referring to FIG. 1 and FIG. 2, indicated at 1 is a let-off stand. The stand 1 has a roller 2 with a wire sheet 3 wound thereon.

FIG. 3 shows the wire sheet 3 in cross section. The wire sheet 3 comprises wires 4 extending longitudinally of the sheet arranged equidistantly side by side in a plane and covered with rubber as elastic material 5. The wire 4 is in the form of a single linear member or a strand or a steel cord. The elastic material 5 is natural or syntheticc unvulcanized rubber or the like.

The wire sheet 3 is prepared, for example, by the calender forming method wherein wires arranged side by side are covered with a rubber layer on the upper and lower sides thereof using a calender unit, or by the coating method wherein the wires are passed through the crosshead of an extruder and thereby covered with rubber.

The wire sheet 3 is unwound from the roller 2 on the let-off stand 1 and fed into the mesh of a pair of gear-shaped upper and lower rolls 6, 6 disposed downstream from the roller 2. The pair of gears 6, 6 are individually driven by a motor 7 so as to rotate at the same speed. Accordingly, the wire sheet 3 is drawn out from the roller 2 on the let-off stand 1 by the gear-shaped upper and lower rolls 6, 6. To impart necessary tension to the wire sheet 3 resulting between the roller 2 and the gear-shaped rolls 6, 6, the roller 2 is provided with a brake device 8.

The pair of gear-shaped rolls 6, 6 are rotatably supported on a gear table 9, and the motor 7 is housed inside the gear table 9. A control panel 10 and an control box 11 are attached to the table 9. The gear table is connected to the let-off stand 1 by a support 12.

The teeth of the pair of gears-shaped rolls 6, 6 are so shaped that the sheet 3 brought into meshing engagement therewith is formed or shaped into sine-curve corrugations. Accordingly, when passed through the pair of gear-shaped rolls 6, 6, the flat wire sheet 3 is vertically corrugated.

The vertically corrugated wire sheet 3 passes between a pair of upper and lower wire laying-down rolls 13, 13 arranged downstream from the gear-shaped rolls 6, 6 and then between a pair of upper and lower wire rolling rolls 14, 14 disposed downstream from the rolls 13, 13.

The pair of laying-down rolls 13, 13 are individually driven by a motor 15 to rotate at the same speed. The pair of rolling rolls 14, 14 are also individually driven by a motor 16 so as to rotate at the same speed.

The laying-down rolls 13 and the rolling rolls 14 are rotatably supported by a rolls table 17, which is connected to the gear table 9 and fixed by lock pins. Mounted on the roll table 17 are a control box 18 for the laying-down roll drive motor 15, and a control box 19 for the rolling roll drive motor 16. An intermediate box 20 for connecting these control boxes 18, 19 to the main control panel 10 is mounted on the gear table 9.

The motors 7, 15, 16 for driving gear-shaped rolls laying-down rolls and rolling rolls, respectively, each comprise a variable geared motor and are made variable in speed by means of frequency change by inverters 21, 22, 23. While the speeds of the motors 7, 15, 16 are determined by speed setting units 24, 25, 26, the speed to be set by each of the units 25, 26 is automatically determined in a specified ratio to the speed set by the unit 24 for gear-shaped rolls 6, 6, when the latter speed is determined.

For automatic operation, the gear-shaped roll drive motor 7 rotates at a speed set by the unit 24 for the gear-shaped rolls. At the same time, the motor 15 for driving the laying-down rolls rotates at a specified ratio to the above speed. At the same time, the motor 16 driving the rolling rolls 14 rotates at a specified ratio to the above speed.

The motors 7, 15, 16 stop at the same time in response to a stop command. Furthermore, the motors 7, 15, 16 are started and stopped by buttons on the respective control boxes 11, 18, 19.

The clearance between each pair of gear-shaped rolls 6, 6, laying-down rolls 13, 13 and rolling rolls 14, 14 is adjustable by a single adjusting bolt (not shown).

Arranged between the pair of gear-shaped rolls 6 and the pair of laying-down rolls 13 are horizontal rolls 27 and a frame 28 for supporting the lower side of the wire sheet 3. Vertical guide rolls 29 are also provided to restrain the sheet from moving laterally. When the leading end of the vertically corrugated wire sheet 3 passes over the frame 28, a tool 30 for laying down the sheet leading end, preferably like the one shown in FIG. 4, is brought into pushing contact with the leading end portion on the frame 28 obliquely from above to reliably laterally lay down the leading end portion of the corrugations. This enables the laying-down rolls 13 to engage the sheet effectively. The wire sheet 3 with its leading end laid down laterally is then caused to enter between the laying-down rolls 13. The wire sheet is thereafter laterally laid down from portion to portion as the leading edge travels forward, so that the tool 30 is no longer necessary for laying down.

The laying-down rolls 13, 13 have a knurled surface, which serves to avoid slip between the rolls 13, 13 and the wire sheet 3 when the vertical corrugations of the sheet are laterally laid down to ensure a smooth laying-down operation.

The rolling rolls 14, 14 are smooth-surfaced.

Although the embodiment described includes two pair of rolls, i.e., the laying-down rolls 13 and the rolling rolls 14, only one set of them may be used when the pressure and the roll clearance are suitably determined.

The wire sheet 3 having the vertical corrugations of the wires 4 laterally laid down to a planar form by the above apparatus is used as it is or as further covered with a further rubber layer as a component for tires.

Useful as tools 30 for laying down the leading end of the sheet are a roller-type hand tool as shown in FIG. 5, a tool 30 which is movable by driving a feed screw 32 by a motor 31 as seen in FIG. 6, or a tool 30 movable in an oblique direction by a cylinder 33 as shown in FIG. 7.

FIG. 8 shows another embodiment of the present invention which is the same as the foregoing embodiment except that the let-off stand is replaced by a wire sheet forming machine 34.

Indicated at 35 are bobbins having wires 4 wound thereon, at 36 a guide plate, at 37, 38 guide rolls, and at 39 a calender unit. The wires 4 are covered with rubber layers 5, 5 serving as an elastic material from above and below to form a wire sheet 3.

The wire sheet 3 prepared by the wire sheet forming machine 34 is passed between a pair of gear-shaped rolls 6 driven at the same speed, thereby being formed into vertical corrugations, and thereafter passed between a pair of flat-surfaced driven rolls 40 so that the vertical corrugations are laid down into a planar arrangement to produce a tire component.

The present invention is not limited to the foregoing embodiments.

INDUSTRIAL APPLICATION

The present invention can be used in the tire manufacturing industry.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A process for producing a component of a tire characterized by passing a wire sheet between a pair of gear-shaped rolls in meshing engagement therewith to vertically corrugate the sheet for reforming, each of the pair of gear-shaped rolls having a plurality of teeth, the longitudinal axis of each of said plurality of teeth being aligned substantially in parallel to the longitudinal axis of the associated gear-shaped roll, the wire sheet comprising wires arranged side by side in a plane and covered with an elastic material, and passing the shaped sheet between a pair of rolls to lay down the vertical corrugations into a planar arrangement.

2. The process of claim 1 characterized in that the elastic material of the wire sheet comprises natural or synthetic unvulcanized rubber.

3. The process of claim 1 characterized in that the wires of the wire sheet are each in the form of a single linear member or strand of metal.

4. The process of claim 1 characterized in that the wire sheet is prepared by a calender forming method wherein the wires are covered with a rubber layer from above and below.

5. The process of claim 1 characterized in that the wire sheet is prepared by the coating method wherein the wires are passed through the crosshead of an extruder and thereby covered with a rubber layer.

6. The process of claim 1 characterized in that specified tension is imparted to the wire sheet when the wire sheet is passed between the pair of gear-shaped rolls in meshing engagement therewith and thereby vertically corrugated.

7. The process of claim 1 characterized in that the pair of gear-shaped rolls is driven by drive means.

8. The process of claim 1 characterized in that the vertical corrugations are shaped in the form of a sine curve.

9. The process of claim 1 characterized in that the vertically corrugated wire sheet is thereafter passed between a pair of upper and lower wire laying-down rolls and further between a pair of upper and lower wire rolling rolls disposed downstream from the laying-down rolls.

10. The process of claim 9 characterized in that the gear-shaped rolls, the wire laying-down rolls and the wire rolling rolls are driven at a specified speed ratio.

11. The process of claim 1 characterized in that between the gear-shaped rolls and a pair of rolls disposed downstream therefrom, the leading end of the wire sheet is passed into the bite between the downstream rolls with the vertical corrugations of the wire sheet laterally laid down in the same direction.

12. The process of claim 11 characterized in that the vertical corrugations of the wire sheet are laterally guided by a tool for laying down the leading end of the wire sheet.

13. An apparatus for producing a component of a tire characterized in that the apparatus comprises a pair of gear-shaped rolls for passing a wire sheet therebetween in meshing engagement therewith to vertically corrugate the wire sheet for each of the pair of gear-shaped rolls having a plurality of teeth, the longitudinal axis of each of said plurality of teeth being aligned substantially in parallel to the longitudinal axis of the associated gear-shaped roll, forming, the wire sheet comprising wires arranged side by side in a plane and covered with an elastic material, and a pair of rolls for passing the formed wire sheet therebetween to lay down the vertical corrugations into a planar arrangement.

14. The apparatus of claim 13 characterized in that the teeth of the gear-shaped rolls are shaped to vertically corrugate the wire sheet in the form of a sine curve.

15. The apparatus of claim 13 characterized by tensioning means for imparting specified tension to the wire sheet disposed upstream from the gear-shaped rolls.

16. The apparatus of claim 13 characterized in that the rolls disposed downstream from the gear-shaped rolls comprise a pair of upper and lower wire laying-down rolls and a pair of upper and lower wire rolling rolls disposed downstream from the laying-down rolls.

17. The apparatus of claim 16 characterized in that the gear-shaped rolls, the wire laying-down rolls and the wire rolling rolls are provided with respective drive means and with a control unit for rotating the rolls in a specified speed ratio.

18. The apparatus of claim 16 characterized in that the wire laying-down rolls are knurled over their surfaces.

19. The apparatus of claim 16 characterized in that the gear-shaped rolls, the wire laying-down rolls and the wire rolling rolls are provided with clearance adjusting means for adjusting the clearance between the upper and lower rolls thereof, respectively.

20. A process for producing a component of a tire characterized by passing a wire sheet between a pair of gear-shaped rolls in meshing engagement therewith to vertically corrugate the sheet for reforming, each of the pair of gear-shaped rolls having a plurality of teeth, the longitudinal axis of each of said plurality of teeth being aligned substantially in parallel to the longitudinal axis of the associated gear-shaped roll, the wire sheet comprising wires arranged side by side in a plane and covered with an elastic material, and passing the shaped sheet between a pair of rolls to lay down the vertical corrugations into a planar arrangement, wherein a specified tension is imparted to the wire sheet when the wire sheet is passed between the pair of gear-shaped rolls in meshing engagement therewith and thereby vertically corrugated.

21. The process of claim 20 wherein the wires are substantially in parallel with the longitudinal axis of the wire sheet.

22. The process of claim 20 wherein the wire sheet is continuous.

23. An apparatus for producing a component of a tire characterized in that the apparatus comprises a pair of gear-shaped rolls for passing a wire sheet therebetween in meshing engagement therewith to vertically corrugate the wire sheet for forming, the longitudinal axis of each of said plurality of teeth being aligned substantially in parallel to the longitudinal axis of the associated gear-shaped roll, the wire sheet comprising wires arranged side by side in a plane and covered with an elastic material, a pair of rolls for passing the formed wire sheet therebetween to lay down the vertical corrugations into a planar arrangement, and a tensioning means for imparting a specified tension to the wire sheet disposed upstream from the pair of gear-shaped rolls.

24. The apparatus of claim 23 wherein the wires are substantially in parallel with the longitudinal axis of the wire sheet.

25. The apparatus of claim 23 wherein the wire sheet is continuous.

* * * * *

UNITED STATES PATENT AND TRADEMARK OFFICE
CERTIFICATE OF CORRECTION

PATENT NO. : 5,115,659

DATED : May 26, 1992

INVENTOR(S) : Masao TAKAMI

It is certified that error appears in the above-identified patent and that said Letters Patent is hereby corrected as shown below:

On the title page: Item

[73] Assignee: Sumitomo Rubber Industries, Limited, Hyogo, Japan

Signed and Sealed this

First Day of March, 1994

Attest:

BRUCE LEHMAN

Attesting Officer

Commissioner of Patents and Trademarks